(12) United States Patent
Smith et al.

(10) Patent No.: US 11,370,588 B2
(45) Date of Patent: Jun. 28, 2022

(54) PACKAGING ASSEMBLIES FOR OPTICAL FIBER APPLICATIONS

(71) Applicant: Ortronics, Inc., New London, CT (US)

(72) Inventors: Daniel M. Smith, Westerly, RI (US); Ryan J. Grandidge, Wakefield, RI (US)

(73) Assignee: Ortronics, Inc., New London, CT (US)

(*) Notice: Subject to any disclaimer, the term of this patent is extended or adjusted under 35 U.S.C. 154(b) by 30 days.

(21) Appl. No.: 16/774,628

(22) Filed: Jan. 28, 2020

(65) Prior Publication Data

US 2020/0247599 A1 Aug. 6, 2020

Related U.S. Application Data

(60) Provisional application No. 62/800,080, filed on Feb. 1, 2019.

(51) Int. Cl.
  *B65D 71/50* (2006.01)
  *B65D 85/30* (2006.01)
  *G02B 6/44* (2006.01)
  *G02B 6/38* (2006.01)

(52) U.S. Cl.
  CPC .......... *B65D 71/50* (2013.01); *B65D 85/30* (2013.01); *G02B 6/4439* (2013.01); *G02B 6/3802* (2013.01)

(58) Field of Classification Search
  CPC .............. G02B 6/44; G02B 6/36; G02B 6/00
  See application file for complete search history.

(56) References Cited

U.S. PATENT DOCUMENTS

| | | | | |
|---|---|---|---|---|
| 4,598,974 A | | 7/1986 | Munn et al. | |
| 5,566,268 A | * | 10/1996 | Radliff | G02B 6/3636 385/114 |
| 6,240,236 B1 | * | 5/2001 | Daoud | G02B 6/3801 385/136 |
| 6,360,051 B1 | * | 3/2002 | Daoud | G02B 6/3801 385/134 |
| 6,801,704 B1 | * | 10/2004 | Daoud | G02B 6/4471 385/134 |
| 7,139,462 B1 | * | 11/2006 | Richlman | G02B 6/4471 385/137 |

(Continued)

OTHER PUBLICATIONS

Instruction pamphlet for Fiber Instrument Sales' Armordillo Splice-On Connectors, Jan. 2018.

*Primary Examiner* — Tina M Wong
(74) *Attorney, Agent, or Firm* — McCarter & English, LLP

(57) ABSTRACT

Advantageous packaging assemblies for use in optical fiber applications are provided. More particularly, the present disclosure provides for improved packaging assemblies (e.g., bandolier-style packaging assemblies) that are configured and adapted to house a plurality of splice-on connector members (e.g., fusion splice-on connector members). The present disclosure provides for improved systems and designs for packaging assemblies for use with splice-on connector members, and where the packaging assemblies are cost-effective, efficient and/or user-friendly. In exemplary embodiments, the present disclosure provides for improved, convenient, low-cost and effective systems and methods for easily packaging a plurality of splice-on connector members for later use (e.g., termination).

23 Claims, 6 Drawing Sheets

(56) References Cited

U.S. PATENT DOCUMENTS

| | | | | |
|---|---|---|---|---|
| 7,272,291 B2* | 9/2007 | Bayazit | ............... | G02B 6/4454 |
| | | | | 385/135 |
| 7,394,963 B2* | 7/2008 | Hartlef | ................ | G02B 6/4471 |
| | | | | 385/134 |
| 8,043,013 B2 | 10/2011 | Lichoulas et al. | | |
| 8,254,742 B2* | 8/2012 | Womack | ............. | G02B 6/4471 |
| | | | | 385/135 |
| 8,920,049 B2 | 12/2014 | Grandidge et al. | | |
| 9,207,422 B2* | 12/2015 | Ray | ..................... | G02B 6/4454 |
| 9,575,278 B2* | 2/2017 | Leclerc | ............... | G02B 6/4471 |
| 9,684,136 B2* | 6/2017 | Cline | ................... | G02B 6/3672 |
| 9,692,220 B2* | 6/2017 | Schrader | ......... | H01B 13/01209 |
| 9,920,858 B2* | 3/2018 | Harnetiaux | ........ | B60R 16/0215 |
| 2002/0006262 A1* | 1/2002 | Galaj | .................. | G02B 6/4459 |
| | | | | 385/137 |
| 2002/0191939 A1* | 12/2002 | Daoud | ................ | G02B 6/4471 |
| | | | | 385/135 |
| 2004/0086254 A1* | 5/2004 | Vastmans | ............ | G02B 6/4471 |
| | | | | 385/136 |
| 2004/0120682 A1* | 6/2004 | Bhagavatula | ......... | G02B 6/364 |
| | | | | 385/137 |
| 2009/0232455 A1* | 9/2009 | Nhep | .................. | G02B 6/3893 |
| | | | | 385/59 |
| 2016/0274295 A1* | 9/2016 | Chen | .................... | G02B 6/0091 |
| 2019/0302371 A1* | 10/2019 | Van Wuijckhuijse | ...................... | |
| | | | | G02B 6/3608 |
| 2020/0018909 A1* | 1/2020 | Chang | .................. | G02B 6/424 |
| 2020/0247599 A1* | 8/2020 | Smith | ................... | B65D 67/02 |
| 2021/0080657 A1* | 3/2021 | Jones | .................. | G02B 6/3838 |

\* cited by examiner

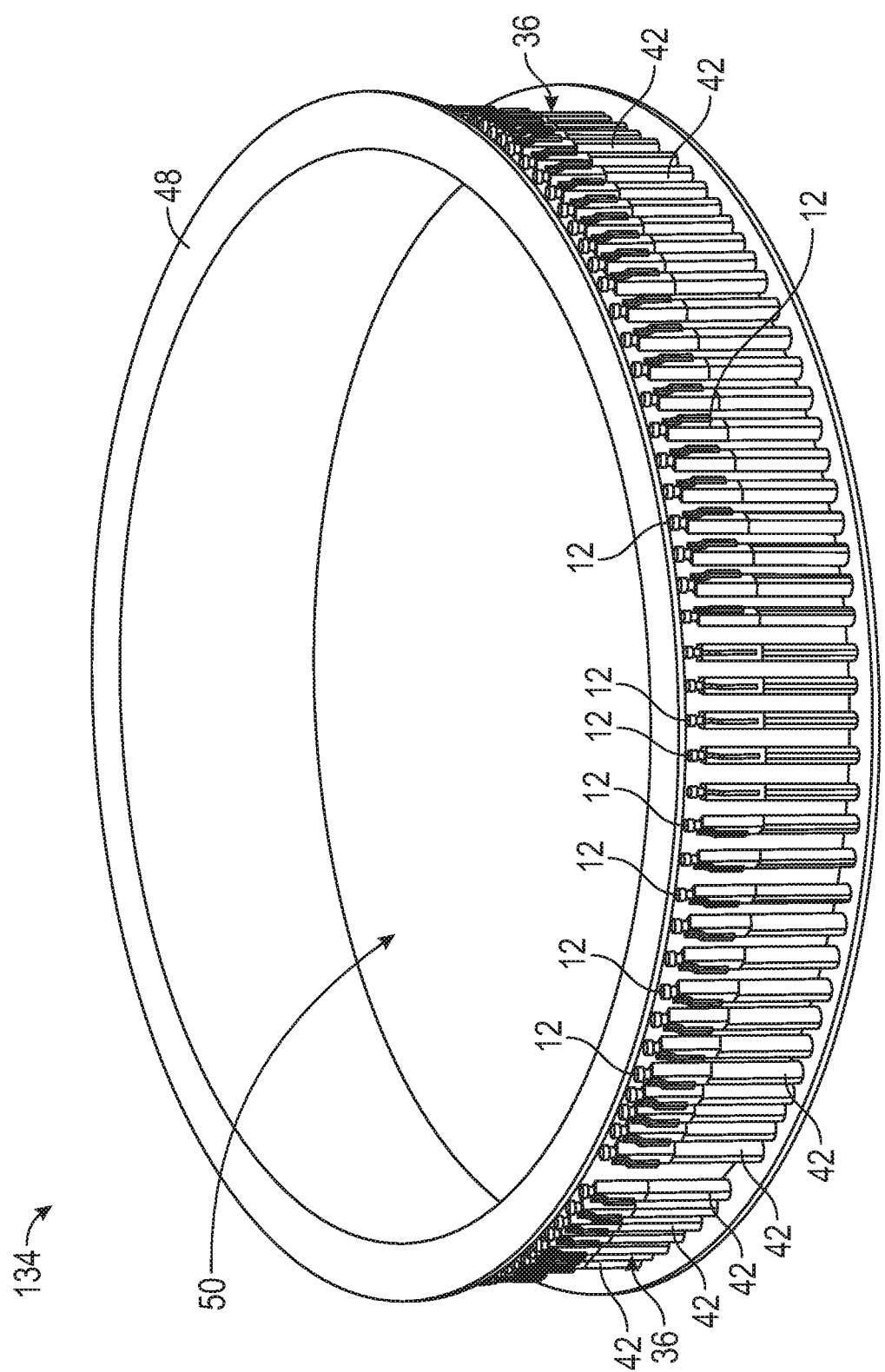

PACKAGING ASSEMBLIES FOR OPTICAL FIBER APPLICATIONS

CROSS-REFERENCE TO RELATED APPLICATION

The present application claims priority benefit to a provisional patent application entitled "Packaging Assemblies for Optic Fiber Applications," which was filed on Feb. 1, 2019, and assigned Ser. No. 62/800,080. The entire content of the foregoing provisional application is incorporated herein by reference.

BACKGROUND

1. Technical Field

The present disclosure generally relates to packaging assemblies for use in optical fiber applications and, more particularly, to packaging assemblies (e.g., bandolier-style packaging assemblies) that are configured and adapted to house splice-on connector members (e.g., fusion splice-on connector members).

2. Background Art

In general, processes for terminating or fusing optical fibers are known. For example, some processes are described and disclosed in U.S. Pat. Nos. 4,598,974 and 8,043,013 and 8,920,049, the entire contents of each being hereby incorporated by reference in their entireties.

Current practice provides that some conventional packaging systems utilize blister pack designs to enclose splice-on connector members for later use (e.g., termination). However, the cardboard backing of such packaging can shed particulate matter and foul the fiber stub and/or ferrule endface.

Other conventional efforts provide for sealed vials or the like in an attempt to ensure the splice-on connector members arrive clean.

However, both of these efforts can be expensive, and neither one really allows one to bulk-pack the connector members for later use.

Thus, despite efforts to date, a need remains for improved systems/designs for packaging assemblies for connector members that are cost-effective, efficient and/or user-friendly. These and other inefficiencies and opportunities for improvement are addressed and/or overcome by the systems, assemblies and methods of the present disclosure.

SUMMARY OF THE DISCLOSURE

The present disclosure provides for improved packaging assemblies for use in optical fiber applications. More particularly, the present disclosure provides for advantageous packaging assemblies (e.g., bandolier-style packaging assemblies) that are configured and adapted to house a plurality of splice-on connector members (e.g., fusion splice-on connector members).

In general, the present disclosure provides for improved systems/designs for packaging assemblies for use with splice-on connector members, and wherein the packaging assemblies are cost-effective, efficient and/or user-friendly. In exemplary embodiments, the present disclosure provides for improved, convenient, low-cost and effective systems and methods for easily packaging a plurality of splice-on connector members for later use (e.g., termination).

The present disclosure provides for a packaging assembly for use in optical fiber applications including an extending member that extends from a first end to a second end, and that extends from a first side to a second side, the extending member including a plurality of housing members extending from the first side to the second side; wherein each housing member of the plurality of housing members is configured to releasably house and contain: (i) a fiber stub extending from a distal end of a housing of a connector member, and (ii) at least a portion of the distal end of the housing of the connector member having the respectively housed fiber stub.

The present disclosure also provides for a packaging assembly for use in optical fiber applications wherein the extending member is a flexible molded or extruded strip-like extending member.

The present disclosure also provides for a packaging assembly for use in optical fiber applications wherein an extension or webbing section is positioned and extends between each successive or adjacent housing member of the plurality of housing members. The present disclosure also provides for a packaging assembly for use in optical fiber applications wherein each extension or webbing section includes a perforated area.

The present disclosure also provides for a packaging assembly for use in optical fiber applications wherein each releasably housed connector member is a splice-on connector member. The present disclosure also provides for a packaging assembly for use in optical fiber applications wherein each releasably housed connector member is a fusion splice-on optical fiber connector member.

The present disclosure also provides for a packaging assembly for use in optical fiber applications wherein each housing member of the plurality of housing members is a substantially C-shaped or substantially U-shaped housing member.

The present disclosure also provides for a packaging assembly for use in optical fiber applications wherein the extending member is configured and dimensioned to be wrapped around a drum or a reel.

The present disclosure also provides for a packaging assembly for use in optical fiber applications wherein the first side or the second side of each housing member of the plurality of housing members is configured to releasably house and contain: (i) the fiber stub extending from the distal end of the housing of the connector member, and (ii) at least a portion of the distal end of the housing of the connector member having the respectively housed fiber stub.

The present disclosure also provides for a packaging assembly for use in optical fiber applications wherein the extending member includes twelve housing members. The present disclosure also provides for a packaging assembly for use in optical fiber applications wherein each perforated area is configured to assist in sub-dividing the extending member into multiple extending members.

The present disclosure also provides for a method for packaging in optical fiber applications including providing an extending member that extends from a first end to a second end, and that extends from a first side to a second side, the extending member including a plurality of housing members extending from the first side to the second side; and releasably housing in each housing member of the plurality of housing members: (i) a fiber stub extending from a distal end of a housing of a connector member, and (ii) at least a portion of the distal end of the housing of the connector member having the respectively housed fiber stub.

The present disclosure also provides for a method for packaging in optical fiber applications wherein the extending member is a flexible molded or extruded strip-like extending member.

The present disclosure also provides for a method for packaging in optical fiber applications wherein an extension or webbing section is positioned and extends between each successive or adjacent housing member of the plurality of housing members. The present disclosure also provides for a method for packaging in optical fiber applications wherein each extension or webbing section includes a perforated area; and wherein each perforated area is configured to assist in sub-dividing the extending member into multiple extending members.

The present disclosure also provides for a method for packaging in optical fiber applications wherein each releasably housed connector member is a fusion splice-on optical fiber connector member.

The present disclosure also provides for a method for packaging in optical fiber applications wherein each housing member of the plurality of housing members is a substantially C-shaped or substantially U-shaped housing member.

The present disclosure also provides for a method for packaging in optical fiber applications wherein the extending member is wrapped around a drum or a reel.

The present disclosure also provides for a method for packaging in optical fiber applications wherein the first side or the second side of each housing member of the plurality of housing members is configured to releasably house and contain: (i) the fiber stub extending from the distal end of the housing of the connector member, and (ii) at least a portion of the distal end of the housing of the connector member having the respectively housed fiber stub.

The present disclosure also provides for a method for packaging in optical fiber applications wherein the extending member includes twelve housing members.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed systems, methods and assemblies, reference is made to the appended figures, wherein:

FIG. 6 is a side perspective view of a packaging assembly in accordance with another exemplary embodiment of the present disclosure.

DETAILED DESCRIPTION OF THE DISCLOSURE

Figure 1:
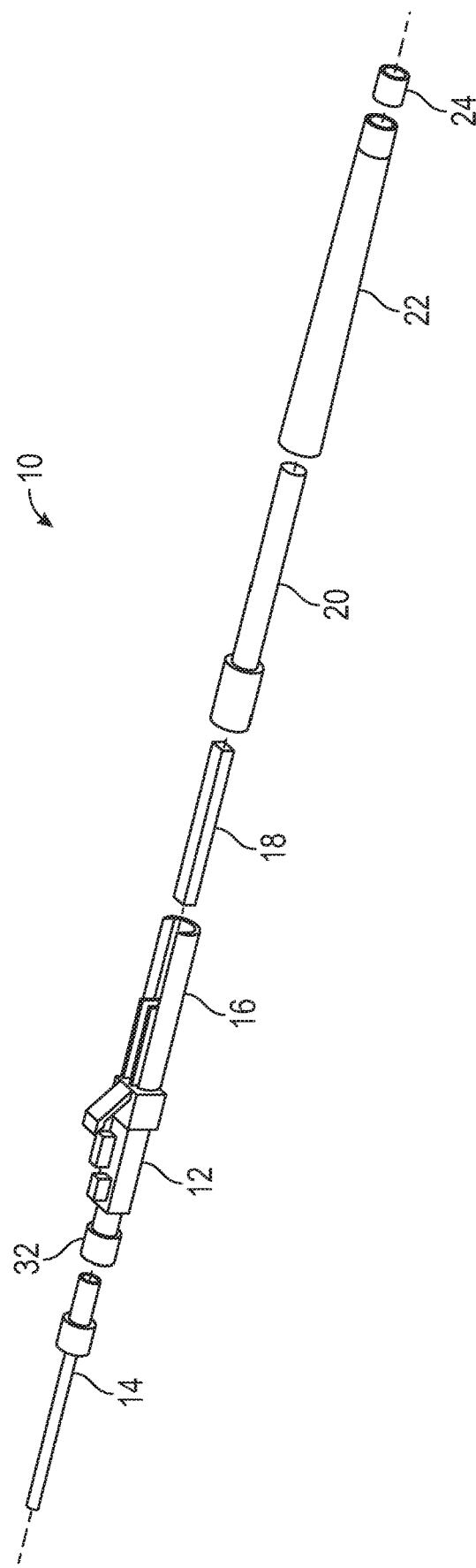
FIG. 1 is a side perspective view of a splice-on connector system in accordance with an exemplary embodiment of the present disclosure.
Figure 2:
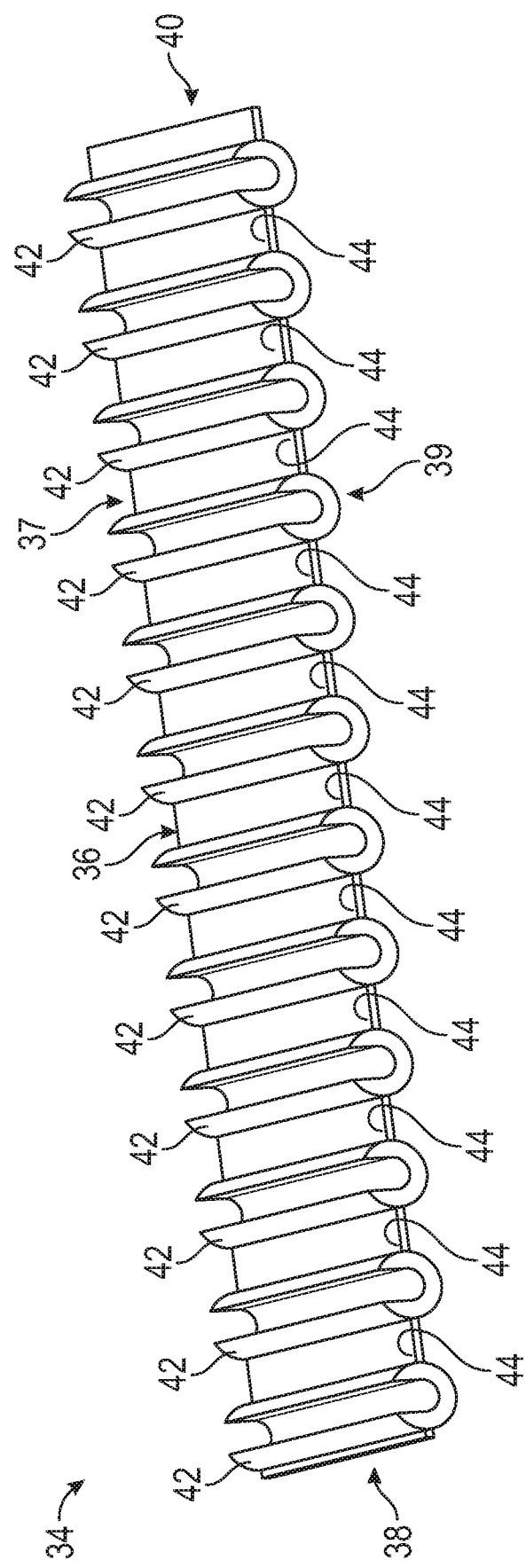
FIGS. 2-5 are side perspective views of a packaging assembly in accordance with exemplary embodiments of the present disclosure.

The exemplary embodiments disclosed herein are illustrative of advantageous packaging assemblies, and systems of the present disclosure and utilization methods/techniques thereof. It should be understood, however, that the disclosed embodiments are merely exemplary of the present disclosure, which may be embodied in various forms. Therefore, details disclosed herein with reference to exemplary packaging assemblies and utilization methods and associated processes/techniques of assembly and use are not to be interpreted as limiting, but merely as the basis for teaching one skilled in the art how to make and use the advantageous packaging assemblies/systems and/or alternative packaging assemblies/systems of the present disclosure.

In general, advantageous packaging assemblies for use in optical fiber applications are provided. More particularly, the present disclosure provides for improved packaging assemblies (e.g., bandolier-style packaging assemblies) that are configured and adapted to house a plurality of splice-on connector members (e.g., fusion splice-on connector members).

The present disclosure provides for improved systems and designs for packaging assemblies for use with splice-on connector members, and where the packaging assemblies are cost-effective, efficient and/or user-friendly. In exemplary embodiments, the present disclosure provides for improved, convenient, low-cost and effective systems and methods for easily packaging a plurality of splice-on connector members for later use (e.g., termination).

Referring now to the drawings, like parts are marked throughout the specification and drawings with the same reference numerals, respectively. Drawing figures are not necessarily to scale and in certain views, parts may have been exaggerated for purposes of clarity.

With reference to FIG. 1, there is illustrated an exemplary splice-on connector system 10 for use in terminating or fusing optical fibers or the like. Splice-on connector system 10 can include a splice-on connector member 12 (e.g., fusion splice-on connector member 12), a dust cap member 14, an optional protector member 16, a shrink sleeve 18, a first crimp component 20, a boot member 22 and a second crimp component 24.

Figure 3:
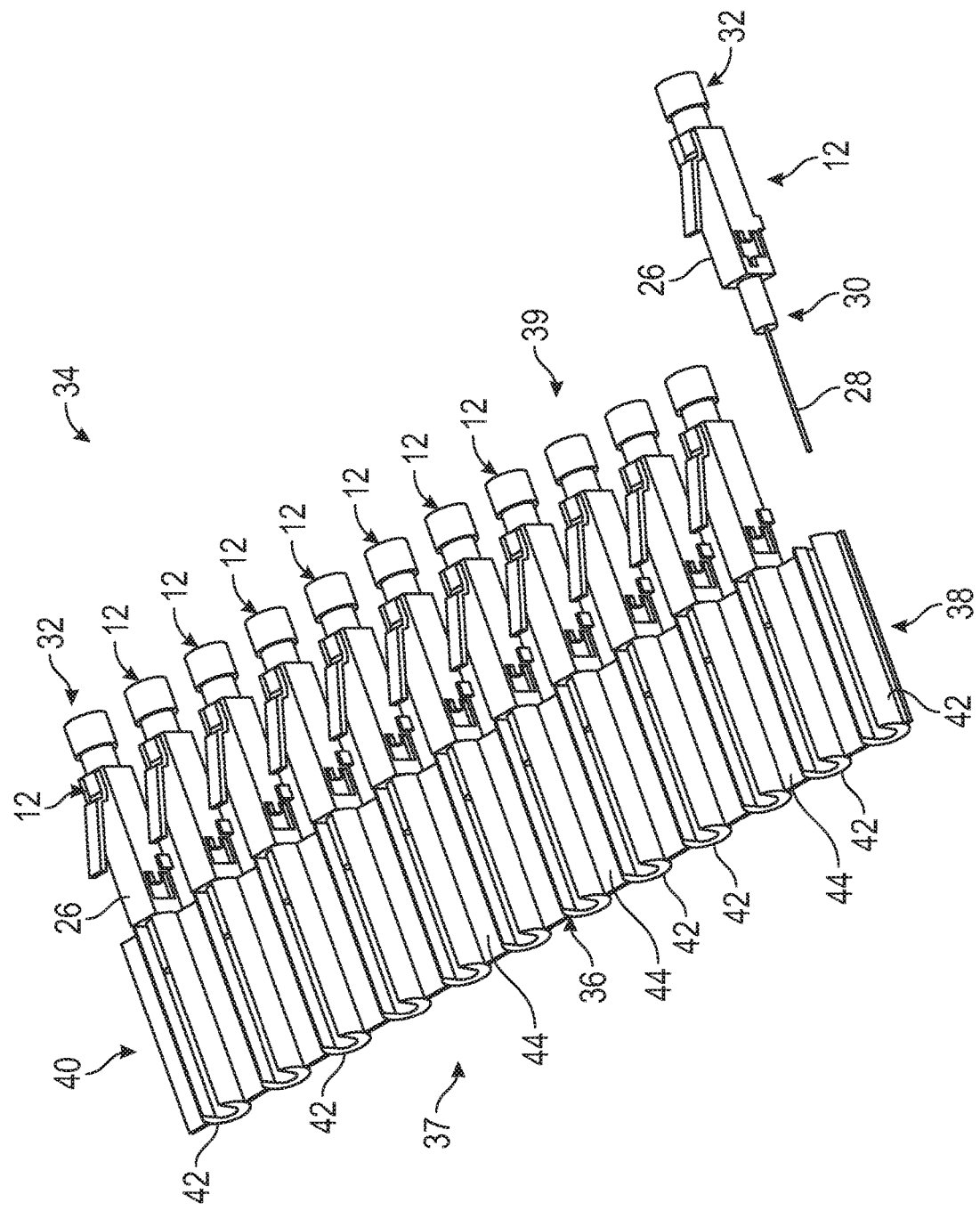

As shown in FIG. 3 and with optional protector member 16 removed, each splice-on connector member 12 includes a housing 26, with a fiber stub 28 that extends from a distal end 30 of the housing 26. It is noted that dust cap member 14 is configured to mount with respect to proximal end 32 of housing 26.

Exemplary splice-on connector member 12 takes the form of a fusion splice-on optical fiber connector member 12 or the like. For example, connector member 12 may be a fiber LC stub connector member 12 to be utilized in conjunction with a fusion splice device/unit or the like. Alternatively, connector member 12 may be another type of connector member 12, such as, for example and without limitation, a SC, ST, MU connector member 12 or the like.

In general, connector member 12 (e.g., fiber LC stub connector member 12) is configured and dimensioned for use in terminating or fusing optical cables/fibers or the like. As such, connector member 12 and a fusion splice device/ unit may be used to achieve field termination of connector member 12 with respect to an optical cable.

Referring back to FIG. 1, it is noted that most of the components, such as the dust cap member 14, first and second crimp members 20 and 24, boot member 22, and shrink sleeve 18 can be bulk-packed.

However, due to the delicate nature of each fiber stub 28, at least portions of the connector member 12 itself should be protected.

In some conventional applications, this is attempted to be accomplished by utilizing the optional protector member 16 (e.g., a press-fit protector member 16).

FIGS. 2-5 depict an exemplary packaging assembly 34 according to the present disclosure. In general, packaging assembly 34 includes an extending member 36 (e.g., a flexible molded or extruded strip-like extending member 36) that extends from a first end 38 to a second end 40, and that extends from a first side 37 to a second side 39.

Exemplary extending member 36 includes a plurality of housing members 42. It is noted that extending member 36 can include any suitable number of housing members 42 (e.g., two, four, eight, twelve, twenty-four, a plurality, etc.).

Figure 5:
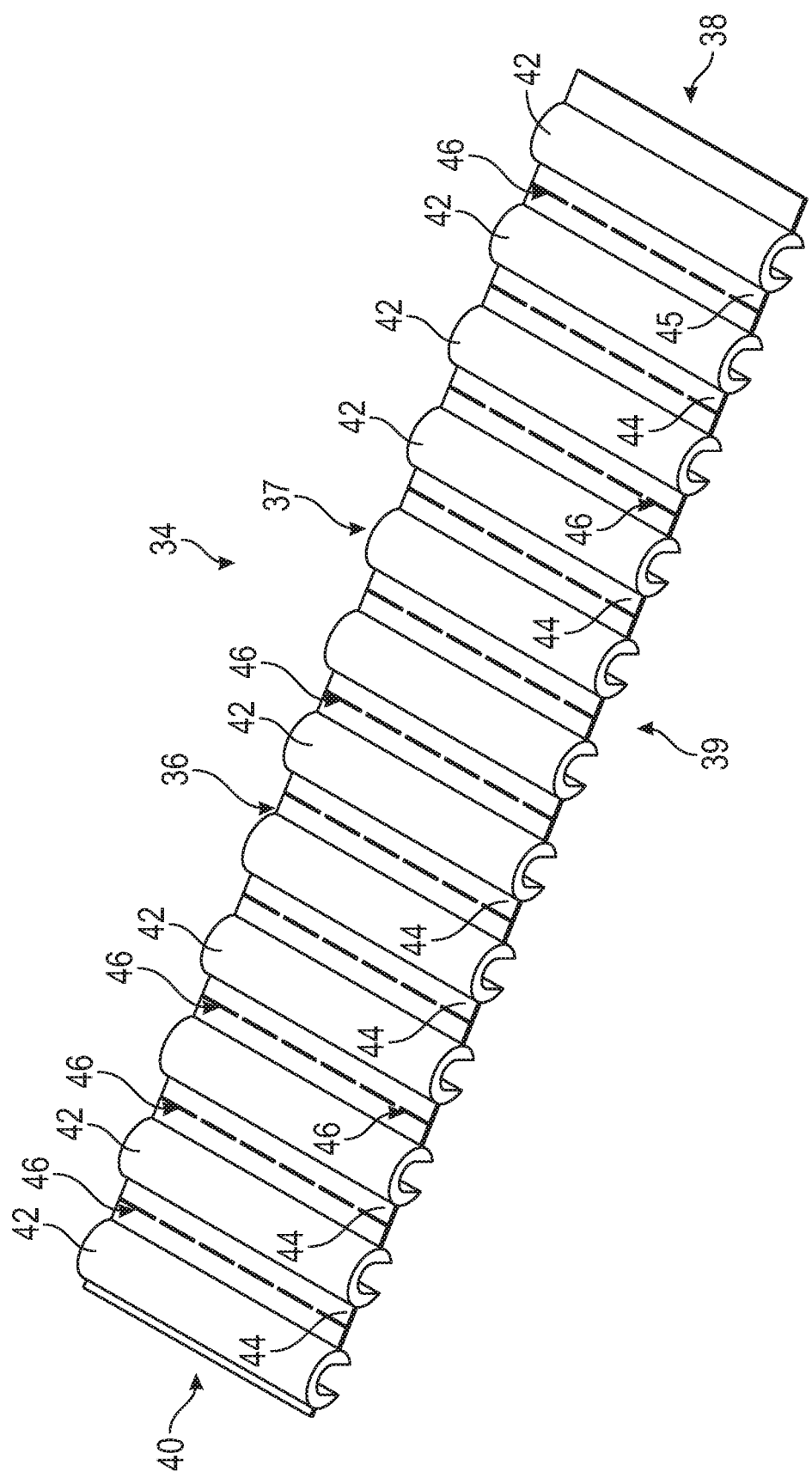

In exemplary embodiments, positioned and extending between each successive or adjacent housing member 42 is an extension or webbing section 44 (e.g., thin extension or webbing section 44), and each extension or webbing section 44 may or may not be perforated by perforated area 46 (FIG. 5).

When present, the perforated areas 46 can assist in sub-dividing the extending member 36 into multiple extending members 36 for different connector member 12 counts per extending member 36, as desired and/or depending upon the application.

Stated another way, the perforated areas 46 allow an extending member 36 (e.g., loaded with connector members 12) to be further subdivided, such as in instances where different technicians need to deploy different numbers of connector members 12 in multiple locations, thereby increasing the versatility of the overall solution of packaging assembly 34, 134.

In general, each housing member 42 is configured to releasably house and contain a fiber stub 28 extending from a distal end 30 of a housing 26 of a connector member 12 (FIG. 3). In exemplary embodiments, each housing member 42 is also configured to releasably house and contain at a portion of the distal end 30 of the housing 26 of the connector member 12 (FIG. 3).

In certain embodiments, each housing member 42 takes the form of a substantially C-shaped or substantially U-shaped housing member 42, although the present disclosure is not limited thereto. Rather, it is noted that each housing member 42 can take a variety of shapes, forms and/or designs.

In some embodiments and as shown in FIG. 3, the fiber stubs 28 of each connector member 12 can be loaded or housed into housing members 42 of extending member 36 from the second side 39 of extending member 36.

Figure 4:
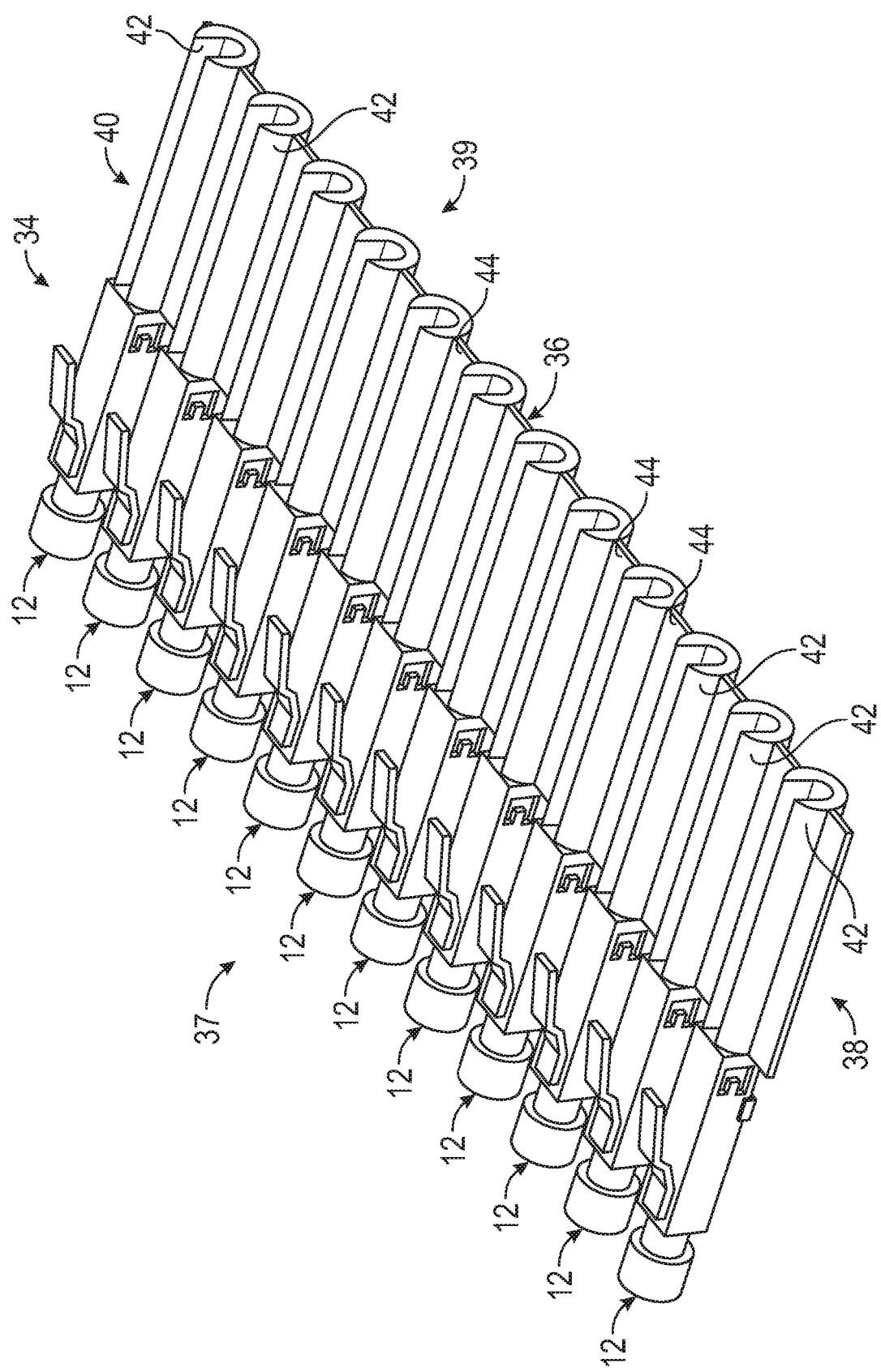

In other embodiments and as shown in FIG. 4, the fiber stubs 28 of each connector member 12 can be loaded or housed into housing members 42 of extending member 36 from the first side 37 of extending member 36.

In general, exemplary packaging assembly 34 allows a user to protect the connector members 12 in large numbers, which thereby allows a user to bulk-package these protected connector members 12.

More specifically, packaging assembly 34 advantageously allows one to package large numbers of connector members 12 together in one place (e.g., within housing members 42 of extending member 36). The individual connectors members 12 of packaging assembly 34 can be loaded and removed as needed from the housing members 42 of extending member 36.

Additionally, the other components of connector system 10 (e.g., dust cap member 14, shrink sleeve 18, first crimp component 20, boot member 22 and/or second crimp component 24) can bulk-packaged as well (e.g., within blister packs or sealed vials, or via some other packaging or the like).

The overall utilization of packaging assembly 34 can be executed in a number of standard ways.

For example, one could have a bin-box or the like with one large bin for the loaded extending members 36 having twelve housing members 42 loaded with connector members 12 (as shown in FIGS. 3 and 4), with a plurality of such loaded extending members 36 laid on top of one another eight-deep for a total of ninety-six connectors, and with the other components (e.g., dust cap member 14, shrink sleeve 18, first crimp component 20, boot member 22 and/or second crimp component 24) sorted in the remaining (smaller) bins.

Another example for packaging assembly 134 and as illustrated in FIG. 6 is to have one or more loaded extending members 36 (e.g., loaded with connector members 12) wrap substantially around a drum or reel 48 or the like (e.g., cylindrical drum or reel 48), with the remaining components (e.g., dust cap member 14, shrink sleeve 18, first crimp component 20, boot member 22 and/or second crimp component 24) bagged and packed into the middle area 50 of the drum or reel 48.

In certain embodiments and as depicted in FIG. 6, a large number of connector members 12 (e.g., one-hundred connector members 12) loaded into one or more extending members 36 can fit around the drum/reel 48 (e.g., with the drum/reel approximately twelve inches in diameter and 2¼" tall). The open middle area 50 can contain bags or the like filled of the other components (e.g., dust cap member 14, shrink sleeve 18, first crimp component 20, boot member 22 and/or second crimp component 24), which may not require careful handling or shipping protection.

Because the major packaging components of assembly 34, 134 is devoted to containing a large number of connector members 12, the packaging cost per connector member 12 is much lower than current methods, while still retaining or improving upon the cleanliness advantages of the vial-packaging solution, and producing far less waste per unit than either solution (more environmentally friendly compared to utilizing blister packs or sealed vials).

It is noted that each extending member 36 can be fabricated from polypropylene or a similar highly-recyclable resin, and certain large-scale bulk-pack solutions (such as the bin-box discussed above) may be substantially re-useable.

Another advantage of packaging assembly 34, 134 is that these assemblies 34, 134 will make it easier and quicker for field technicians to deploy the connector members 12. Whereas conventional practice provides that users currently need to unwrap each connector member 12 individually and then sort out the individual components (e.g., dust cap member 14, shrink sleeve 18, first crimp component 20, boot member 22 and/or second crimp component 24), with this packaging solution of assembly 34, 134, the technician can grab an extending member 36 (e.g., an extending member loaded with twelve connector members 12 or more), and obtain the other components (e.g., dust cap member 14, shrink sleeve 18, first crimp component 20, boot member 22 and/or second crimp component 24) from pre-sorted bins or bags (or from middle area 50 of drum/reel 48). In short, the solutions provided by assemblies 34, 134 are less expensive, more robust, more environmentally-friendly, and more user-friendly than current art.

The extending members 36 can be extended in length (and thus capacity) essentially without limit. One could place the loaded connector members 12 of extending member 36 on a dispensing reel, packaging the remaining components (e.g., dust cap member 14, shrink sleeve 18, first crimp component 20, boot member 22 and/or second crimp component 24) in a separate container entirely.

As such, packaging assemblies 34, 134 advantageously allow connector members 12 to be bulk packaged in large quantities, which is much more cost effective, more efficient in deployment, and environmentally friendly (less packaging waste produced per connector member 12) than the individual unit packaging which conventional practice provides.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A packaging assembly for use in optical fiber applications, comprising:
    an extending member that extends from a first end to a second end, and that extends from a first side to a second side, the extending member including a plurality of housing members extending from the first side to the second side;
    wherein each housing member of the plurality of housing members is configured to releasably house and contain a preterminated fiber stub extending from a distal end of a housing of a connector member, the preterminated fiber stub disposed outside of the housing of the connector member.

2. The packaging assembly of claim 1, wherein the extending member is a flexible molded or extruded strip-like extending member.

3. The packaging assembly of claim 1, wherein an extension or webbing section is positioned and extends between each successive or adjacent housing member of the plurality of housing members.

4. The packaging assembly of claim 3, wherein each extension or webbing section includes a perforated area.

5. The packaging assembly of claim 1, wherein the connector member is a splice-on connector member.

6. The packaging assembly of claim 1, wherein the connector member is a fusion splice-on optical fiber connector member.

7. The packaging assembly of claim 1, wherein each housing member of the plurality of housing members is a substantially C-shaped or substantially U-shaped housing member.

8. The packaging assembly of claim 1, wherein the extending member is configured and dimensioned to be wrapped around a drum or a reel.

9. The packaging assembly of claim 1, wherein the first side or the second side of each housing member of the plurality of housing members is configured to releasably house and contain the preterminated fiber stub extending from the distal end of the housing of the connector member.

10. The packaging assembly of claim 1, wherein the extending member includes twelve housing members.

11. The packaging assembly of claim 4, wherein each perforated area is configured to assist in sub-dividing the extending member into multiple extending members.

12. A method for packaging in optical fiber applications, the method comprising:
    providing an extending member that extends from a first end to a second end, and that extends from a first side to a second side, the extending member including a plurality of housing members extending from the first side to the second side; and
    releasably housing in each housing member of the plurality of housing members a preterminated fiber stub extending from a distal end of a housing of a connector member, the preterminated fiber stub disposed outside of the housing of the connector member.

13. The method of claim 12, wherein the extending member is a flexible molded or extruded strip-like extending member.

14. The method of claim 12, wherein an extension or webbing section is positioned and extends between each successive or adjacent housing member of the plurality of housing members.

15. The method of claim 14, wherein each extension or webbing section includes a perforated area; and
    wherein each perforated area is configured to assist in sub-dividing the extending member into multiple extending members.

16. The method of claim 12, wherein each releasably housed connector member is a fusion splice-on optical fiber connector member.

17. The method of claim 12, wherein each housing member of the plurality of housing members is a substantially C-shaped or substantially U-shaped housing member.

18. The method of claim 12, wherein the extending member is wrapped around a drum or a reel.

19. The method of claim 12, wherein the first side or the second side of each housing member of the plurality of housing members is configured to releasably house and contain the preterminated fiber stub extending from the distal end of the housing of the connector member.

20. The method of claim 12, wherein the extending member includes twelve housing members.

21. The packaging assembly of claim 1, wherein each housing member of the plurality of housing members is configured to releasably house and contain the preterminated fiber stub extending from the distal end of the housing of the connector member such that the housing of the connector member is disposed outside of the housing member.

22. The packaging assembly of claim 1, wherein the preterminated fiber stub includes a first end disposed inside of the housing of the connector member, and an opposing second end extending from the distal end of the housing of the connector member and disposed outside of the housing of the connector member.

23. The packaging assembly of claim 1, wherein each housing member of the plurality of housing members is configured to releasably house and contain the preterminated fiber stub in a nonelectrical manner for protecting the preterminated fiber stub during packaging and/or shipment.

* * * * *